CODE COMMUNICATION SYSTEM

Filed Dec. 19, 1967 Sheet 1 of 4

INVENTORS
J.H.AUER JR., J.P.HUFFMAN
AND R.P.VAN WORMER
BY Forest B. Hitchcock
THEIR ATTORNEY INVENTORS
J.H.AUER JR., J.P.HUFFMAN
AND R.P.VAN WORMER
BY
Forest B. Hitchcock
THEIR ATTORNEY

| NORMAL | BINARY STAGE 1 | BINARY STAGE 2 | BINARY STAGE 3 | PRE-SET |
|---|---|---|---|---|
| 0 | 1 | 1 | 1 | 1 |
| 1 | 0 | 1 | 1 | 1 |
| 2 | 1 | 0 | 1 | 0 |
| 3 | 0 | 0 | 1 | 1 |
| 4 | 1 | 1 | 0 | 2 |
| 5 | 0 | 1 | 0 | 3 |
| 6 | 1 | 0 | 0 | 4 |
| 7 | 0 | 0 | 0 | 5 |
| 0 | 1 | 1 | 1 | 1 |

INVENTORS
J.P. HUFFMAN, J.H. AUER, JR.
AND R.P. VAN WORMER

BY Forest B. Hitchcock
THEIR ATTORNEY

INVENTORS
J.P. HUFFMAN, J.H. AUER, JR.
AND R.P. VAN WORMER

BY Forest B. Hitchcock
THEIR ATTORNEY 3,423,733
United States Patent Office
Patented Jan. 21, 1969

3,423,733
CODE COMMUNICATION SYSTEM
John H. Auer, Jr., Fairport, and Jerry P. Huffman and Roger P. Van Wormer, Rochester, N.Y., assignors to General Signal Corporation, Rochester, N.Y., a corporation of New York
Continuation-in-part of application Ser. No. 336,787, Jan. 9, 1964. This application Dec. 19, 1967, Ser. No. 701,025
U.S. Cl. 340—168 34 Claims
Int. Cl. H04q 1/32

ABSTRACT OF THE DISCLOSURE

Apparatus for transmitting information to traffic signal control equipment during successive operational timing cycles in which pulses generated at a repetition rate relative to the cycle duration are sensed by a digital counter. The digital counter at a predetermined pulse count produces a read-in signal transferring the traffic signal information from an information source to a transmitting shift register. Shift pulses cause the information to be serially transferred to a receiving register in the traffic signal control equipment. The receipt of a binary one bit transmitted as the first pulse of each information message in the last stage of the receiving register effects a transfer of the information to various storage and utilization equipment intended for the control of the traffic signals in the desired manner.

*Related applications*

This application is a continuation-in-part of Ser. No. 336,787, filed January 9, 1964, and now abandoned, Code Communication System, by John H. Auer, Jr., Jerry P. Huffman, and Roger P. Van Wormer.

*Background of the invention*

This invention relates to a communication system for transmitting control information to traffic signal controller equipment, and more particularly to systems for transmitting coded cycle length, offset and split information.

For many applications efficient traffic flow can be maintained only through the integrated control of a plurality of traffic signals along a particular artery. This control employs a progressive signaling system wherein successive traffic signals along the artery are sequentially timed so that vehicles proceeding at a desired or predetermined velocity encounter green or go signals allowing unimpeded progress.

The achievement of this progressive signaling requires that the local control equipment for each traffic signal or groups of traffic signals be timed to display a green indication only at a predetermined time beginning after a selected interval subsequent to the start of the green indication for the prior adjacent signal. This interval is commonly known and defined as the local offset. It may be obtained at each local controller by establishing a reference or background zero time for the entire system, and requiring through the utilization of operational cycle timing equipment that each of the local controllers be time phased with respect to the basic operational cycle time background zero. Thus, the local zero time at any controller bears a predetermined phase relation to the background zero time even though the same total operational cycle duration is demarcated. This predetermined phase relation or offset is independently selected for each local controller in accordance with the desired traffic flow condition.

In addition to the offset determination for each local controller a particular cycle split, again depending upon traffic conditions, must also be selected. Split may be defined as the ratio of the total green indication time of a particular phase with respect to the total duration of the signal operational cycle. Means for computing the desired split as well as the equipment organization needed to supply required traffic information is disclosed and described in Patent No. 3,305,827, Traffic Signal Cycle Split Control System, inventors John H. Auer, Jr. and Klaus H. Frielinghaus, and is typical of that which may be employed in a progressive signal system.

The operational cycle duration is defined as the time required for one complete sequence of signal indications in a traffic signal. In order to progress traffic smoothly in addition to the offset and split requirements the basic cycle length must be varied to accommodate the variable traffic speeds encountered while still maintaining the required smooth traffic pattern. To adequately match or maintain the desired signal progression in the most economical and simplest fashion both variations in cycle time and offset are used. The use of variable cycle time to compensate for variations invehicle speed is adequately disclosed in application No. 306,036, Traffic Signal Controller Cycle Computer, filed Sept. 3, 1963 by John H. Auer, Jr. This application shows an equipment organization capable of providing the desired cycle times.

The transmission of this cycle, offset and split information to the local signal controller necessitates the transmission of relatively large amounts of data over long distances and imposes communication problems. For example, to economically transmit this information to a large number of local controllers, it is desirable that the system be connected in a party-line fashion, thus requiring the utilization of coded information allowing the communication of data via a single channel either wire or radio.

It is further important to the transmission of control data that this information be received by the local controlling equipment at a particular time during the basic operational cycle. The offset information should be communicated to the local controller prior to the zero count of the background cycle while the split information can only be entered into the local traffic signal control apparatus at the local zero count of that particular signal, i.e. the local zero as determined by the specific offset for the location. It is therefore seen that a code communication system capable of sending information bits at a particular rate for the establishing of the operational cycle time as well as at a particular count for the offset and split information is necessary to meet the requirements for a progressive traffic signal control system.

It is therefore an object of this invention to provide a code communication system for the transmission of cycle offset and split information to local signal controllers.

Another object is to provide a code communication system wherein cycle, offset and split information is transmitted to local controllers in a pair of signals.

Another object is to provide a system for transmitting traffic signal control information in a single signal having a variable repetition rate for the establishing of cycle length and variable duration pulses for the conveying of offset and split information.

Another object of this invention is to provide a code communication system capable of determining when a complete message has been transmitted by the encoder and a complete message received by the decoder.

*Summary of the invention*

The invention herein disclosed contemplates apparatus for communicating traffic control data during an operational cycle to at least one signal controller. The control data is registered in a first accumulating means at a predetermined time in the operational cycle. After the information is registered it is then advanced out of the first accumulating means into a second accumulating means located within a signal controller and is therein registered. Read-out equipment supplies the data then registered in the second accumulating means to the signal controller when the entire traffic control data initially registered in the first accumulating means is registered in the second accumulating means.

The foregoing and other objects and advantages of the invention will become apparent from the following detailed description when read in conjunction with the accompanying drawings.

*Description of the preferred embodiments*

Figures 1A, 2:
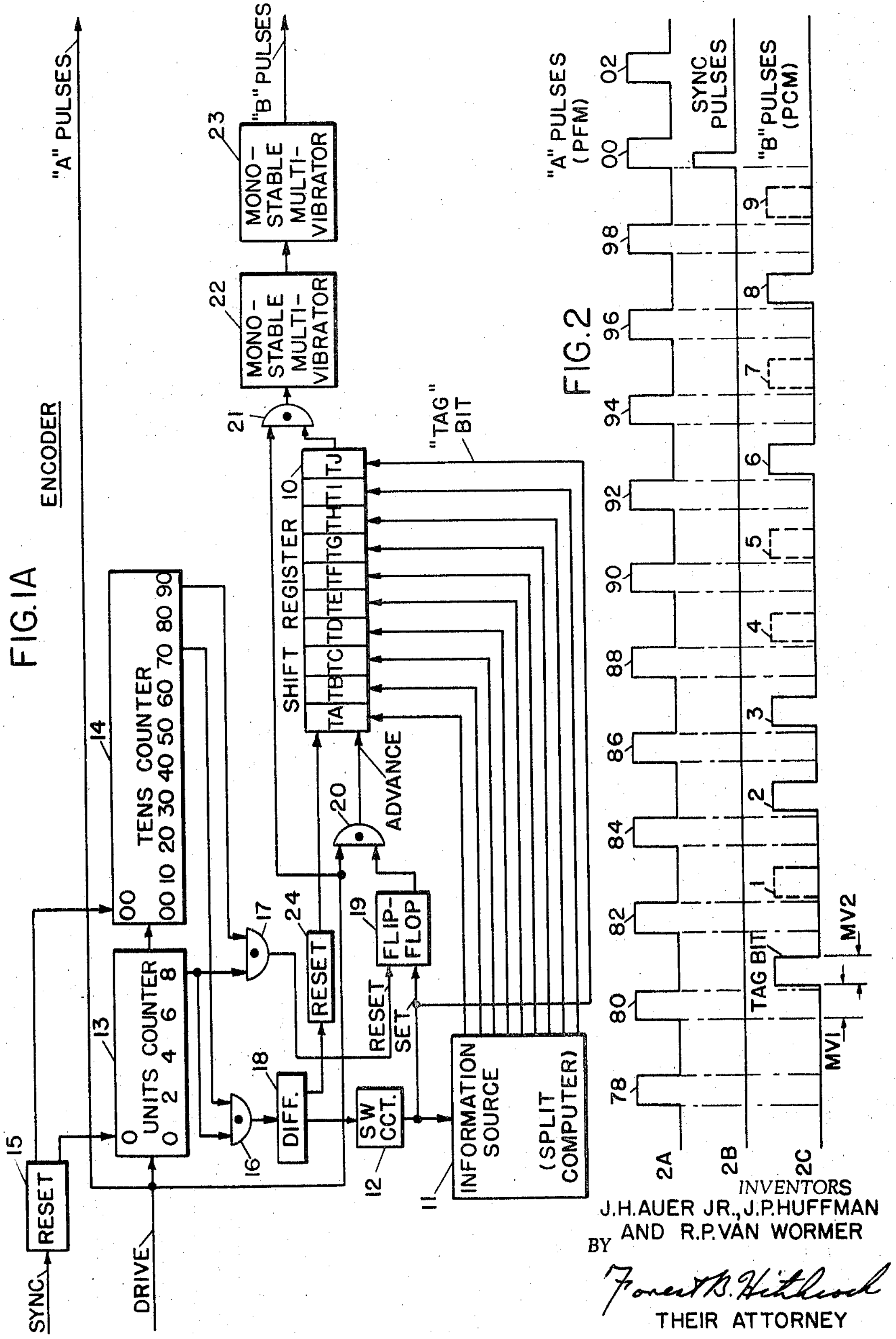
FIG. 1A is a block diagram of one embodiment of the communication system encoder circuit.
FIG. 2 is a representation of voltage wave forms in explaining the operation of the communication system as organized in FIGS. 1A and 1B.

In accordance with the first embodiment of this invention, FIG. 1A, there is shown a shift register 10 comprising stages TA-TJ. Energy is supplied to the aforementioned stages, in parallel, from an information source 11, which includes means for energizing one or more output leads in accordance with information contained therein. One example of a typical information source is the master split computer of J. H. Auer, Jr. and K. H. Frielinghaus, Patent No. 3,305,827, filed Dec. 20, 1963, issued Feb. 21, 1967 along with the offset computer of J. H. Auer, Jr. and L. A. Ross, Patent No. 3,278,896 filed Sept. 3, 1963, issued Oct. 11, 1966.

Shift register 10, being composed of nine message stages TA-TI, along with a single "tag" stage TJ, is capable of handling nine-bit codes. Obviously, additional shift register stages may be added in order to enhance the code carrying capability of the system accordingly. Information is transferred from information source 11 to shift register 10 upon energization of the information source from a switching circuit 12.

The encoder is equipped with pulse counting means comprising a units counter 13 and a tens counter 14. Each of these counters preferably comprises a ring counter, such as those well known in the art. Drive pulses are supplied to units counter 13, which, upon reaching its maximum count, transfers a pulse to tens counter 14 upon occurrence of the next received drive pulse, which also resets units counter 13 to zero. The aforementioned drive pulses occur repetitively at a controllable pulse repetition rate in typical PFM, pulse frequency modulation, fashion. As utilized in a traffic control system, the drive pulses may comprise system background cycle pulses, such as those produced by the cycle computer described in J. H. Auer, Jr., application No. 306,036, filed Sept. 3, 1963. Background pulses provided by the cycle computer of the aforementioned Auer application typically comprise 100 pulses per traffic signal cycle, although where resolution requirements are not as stringent, 50 pulses per signal cycle may be produced instead.

This may be accomplished by eliminating alternate pulses, such as the odd-numbered pulses, so that only the even-numbered pulses remain. In a system utilizing only the even-numbered pulses, resolution is decreased to 2%, as opposed to 1% resolution attainable when the signal cycle is divided into 100 pulses. It has been determined, however, that 2% resolution provides sufficient accuracy for reliable operation of traffic signal control systems. Thus, these even-numbered pulses, also referred to as A pulses, comprise the system cycle rate pulses, and are illustrated by waveform 2A of FIG. 2.

Each counter is reset by occurrence of a sync pulse at background time zero, indicated by occurrence of A pulse 00, through a reset circuit 15. Upon start of the sync pulse, this switching circuit functions to deenergize both counters, destroying any count existing therein. Upon completion of the sync pulse, reset circuit 15 sets both counters to zero.

Output voltage is supplied from the 8 stage of units counter 13 and the 70 stage of tens counter 14 to an AND circuit 16. Similarly, output voltage is supplied from the 8 stage of units counter 13 and the 90 stage of tens counter 14 to an AND circuit 17. Hence, upon occurrence of background cycle pulse 78, AND circuit 16 provides an output voltage to differentiator circuit 18, while upon occurrence of background cycle pulse 98, AND circuit 17 resets a flip-flip circuit 19.

Differentiator circuit 18, upon receiving energization from AND circuit 16, energizes a reset circuit 24 which immediately removes energy from the shift register, extinguishing information which may be stored in any stages of the shift register. Simultaneously, switching circuit 12 is energized preparatory to initiating readout of information source 11. After a time delay dependent upon the differentiator circuit time constant, that is, when the differentiator circuit output voltage drops to a predetermined low value, energy is reapplied to shift register 10 from reset circuit 24. Simultaneously, switching circuit 12 produces readout of information from source 11 into shift register 10 and energizes shift register stage TJ, thereby supplying a "tag" bit to the shift register as an indication that coded information has been transferred thereto. In addition, the switching circuit 12 also places flip-flip circuit 19 in a set condition. In a traffic signal control system, the aforementioned coded information typically represents split and offset information.

When flip-flip circuit 19 is in a set condition, one input to a two-input AND circuit 20 is fulfilled by output energy therefrom. Cycle rate, or drive pulses are directly coupled to the other input of AND circuit 20, enabling each individual cycle rate pulse to be coupled through AND circuit 20 as an advance pulse for shift register 10. This produces serial transfer of information stored in the shift register to one input of a two-input AND circuit 21, which receives the drive pulses at its other input. Hence, AND circuit 21 provides output pulses each time a binary ONE is transferred out of shift register 10 stage TJ, and provides no output pulse each time a binary ZERO is transferred out of stage TJ. Thus, information supplied from shift register 10 to AND circuit 21 is in the form of PCM, pulse code modulation, pulses, herein designated B pulses.

Output pulses produced by AND circuit 21 are applied to a first monostable multivibrator 22, which initiates a pulse of predetermined duration upon occurrence of a drive pulse. A second monostable multivibrator 23 is triggered by completion of the pulse produced by monostable multivibrator 22. The pulse produced by monostable multivibrator 23 is thus initiated after a predetermined interval of length dependent upon the time constant of multivibrator 22, subsequent to triggering of multivibrator 22. The duration of the pulse produced by multivibrator 23 determines the width of the B pulses.

Consider now operation of the encoder of FIG. 1A in a traffic signal control system. Cycle rate pulses, comprising A, or drive pulses, are supplied to units counter 13.

Each drive pulse received by counter 13 shifts the count within the counter upwards by two until count 8 is reached. The next drive pulse then resets counter 13 to zero and steps tens counter upwards by ten. When tens counter 14 is stepped upwards from 90 by units counter 13, both units counter 13 and tens counter 14 are reset to zero by the drive pulse initiating this step, simultaneously signifying completion of a traffic signal cycle and initiation of a successive signal cycle.

In normal operation, a sync pulse as illustrated by waveform 2B of FIG. 2 is produced by the cycle computer in a manner such as that described in aforementioned Patent No. 3,305,827. Thus, sync pulses may be provided from a counter producing an output pulse at the completion of a particular count, such as a count of 100 which represents 50 received pulses. Under normal conditions, counters 13 and 14 are at count zero when the sync pulse is received, as illustrated by waveforms 2A and 2B of FIG. 2, but if for some reason it is desired to shift background time zero, it is merely necessary to apply an external sync pulse to the input of reset circuit 15 at the proper time. This will establish a new background time zero at the encoder. In order to prevent an incorrect B code from being transmitted, a sync pulse should not be applied to reset circluit 15 while the B code is being serially shifted from the shift register; therefore, in the particular circuit shown, this time occurs between background cycle pulses 80 and 00, although it may be made to occur earlier in the cycle simply by altering the connection from units counter 13 and tens counter 14 to AND circuits 16 and 17.

The B code provided at the output of monostable multivibrator 23 and represented by waveform 2C of FIG. 2 comprises nine bits in the embodiment illustrated. Because of the nine bits plus the "tag" bit, it is necessary to establish the B code in shift register 10 upon occurrence of background cycle pulse 78. Thus, the first B pulse, which consists of the "tag" bit and is always a binary ONE, is serially shifted out of the shift register upon occurrence of background cycle pulse 80, and the final B pulse, if a binary ONE has been supplied to stage TA of shift register 10, is serially shifted out of shift register 10 upon occurrence of background cycle pulse 98, arriving at the decoder, shown in FIG. 1B, immediately prior to background cycle pulse 00.

Subsequent to background cycle pulse 00 and prior to background cycle pulse 78, under normal conditions, shift register 10 contains a binary ZERO in each of its stages. At count 78 both inputs to AND circuit 16 are fulfilled, thereby triggering differentiator circuit 18. Reset circuit 24 then removes energy from shift register 10 thereby extinguishing any binary ONE which might exist, under abnormal circumstances, in any stage of the shift register. Simultaneously, differentiator circuit 18 energizes switching circuit 12 placing it in a so-called "cocked" condition.

When the output voltage of differentiator circuit subsequently decreases to a predetermined value, energy is restored to shift register 10 by reset circuit 24, and output voltage is simultaneously produced by switching circuit 12. Information source 11 is triggered by the switching circuit output voltage, causing transfer of information to shift register 10. Simultaneously, the switching circuit sets flip-flip circuit 19, fulfilling one input to AND circuit 20, and couples a "tag" bit into shift register stage TJ. With shift register stages TA–TI now containing binary ONE's or ZERO's, according to the output of information source 11, and shift register stage TJ containing a binary ONE, each drive pulse supplied to the shift register through AND circuit 20 advances each binary bit to a successive shift register stage, while each bit stored in stage TJ is successively transferred to one input of AND circuit 21. Each drive pulse fulfills the other input to AND circuit 21, so that each time a binary ONE is transferred from shift register stage TJ to AND circuit 21, monostable multivibrator 22 is triggered into a cycle of operation. Completion of this cycle by multivibrator 22 thereupon triggers monostable multivibrator 23. Each output pulse produced by monostable multivibrator 23 comprises a B pulse which is transmitted to the decoder. The duration of each B pulse is dependent upon the time constant of multivibrator 23, while the time at which the B pulse is initiated, after the A pulse, is dependent upon the time constant of multivibrator 22. Use of multivibrators 22 and 23 thus assures that the B pulses are interlaced between the A pulses, and are never generated at the same time.

Those skilled in the art will recognize the advantage of preventing application of advance pulses to the shift register during the time in which a B code is not present in the shift register. This is desirable since extraneous noise may introduce a binary ONE into any one of the shift register stages, which would then be transferred to stage TJ by the advance pulses, producing a "tag" bit which would cause erroneous information to be received at the decoder. Hence, flip-flip circuit 19 is maintained in a reset condition, in the system illustrated in FIG. 1A, from the time A pulse 00 occurs to the time A pulse 78 occurs. During this period, advance pulses cannot reach shift register 10 because flip-flop circuit 19 does not fulfill one of the inputs to AND circuit 20.

The phase relationship existing between the PFM or A pulses and the PCM or B pulses is illustrated by waveforms 2A and 2C of FIG. 2. The time constant of multivibrator 22 is indicated by an interval designated MV1 in FIG. 2, while the time constant of multivibrator 23 is indicated by an interval designated MV2. For proper system operation, interval MV1 must be longer than the duration of the A pulses, while the total duration of intervals MV1 and MV2 must be shorter than the minimum time between successive A pulses. The reasons for interlacing the A and B pulses will become obvious in the description of decoder operation.

Figure 1B:
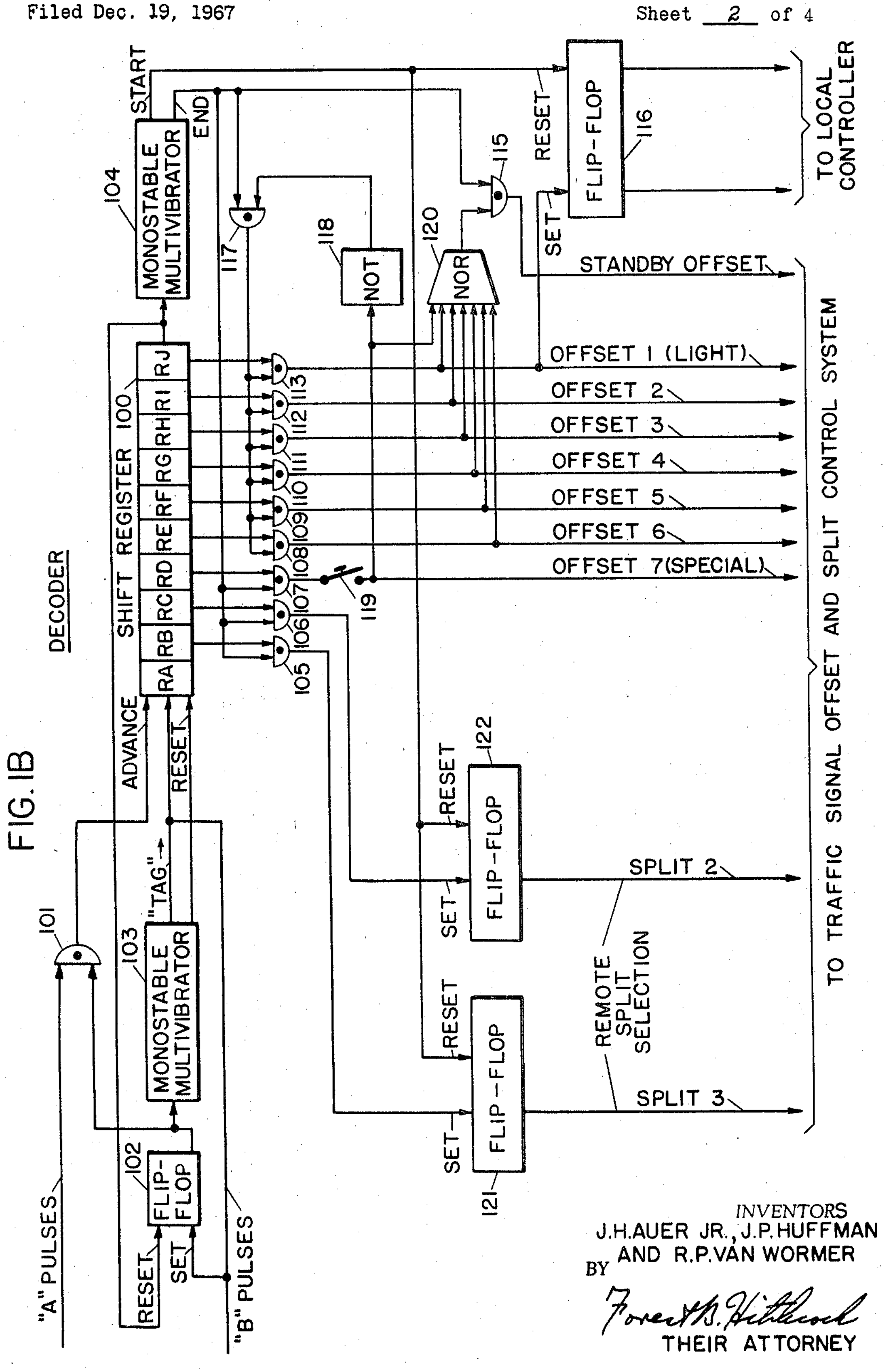
FIG. 1B is a block diagram of one embodiment of the communication system decoder circuitry.

FIG. 1B is a block diagram of the system decoder. B pulses are serially supplied to the first stage RA of a shift register 100, comprising stages RA–RJ. The B code is serially shifted into the shift register by advance pulses comprising the A pulses, which are supplied through a two-input AND circuit 101. The B pulses are also used for setting a flip-flop circuit 102, which then provides an output signal to both the second input of AND circuit 101 and the input to a monostable multivibrator 103. Energy supplies on one output of multivibrator 103 resets shift register 100 by extinguishing any information which may be stored therein at the instant the multivibrator is triggered. Upon completion of the multivibrator cycle of operation, which is dependent upon the multivibrator time constant, a "tag" pulse is provided at the other output of the multivibrator, thereby supplying a binary ONE to shift register stage RA. This binary ONE is serially advanced through shift register 100 upon occurrence of each A pulse. Subsequent B pulses are supplied directly to shift register stage RA from the means communicating these pulses from the encoder.

A monostable multivibrator 104 is triggered by each output pulse from the final stage RJ of shift register 100. Simultaneously, flip-flip circuit 102 is reset by the same output pulse from shift register stage RJ, which occurs each time a "tag" bit is serially transferred out of stage RJ.

A plurality of two-input AND circuits 105–113 are provided in the decoder. A first input to each of AND circuits 105–113 is provided respectively from each of shift register 100 stages RB–RJ. A second input to each of AND circuits 105–107 is supplied from one output of multivibrator 104 after a time interval of duration equal to the multivibrator time constant measured from the time the multivibrator is triggered by an ouput pulse from shift register 100 stage RJ. This output pulse provided by multivibrator 104 is also supplied to one input of a two-input AND circuit 117 and to one input of a two-input AND circuit 115. At the instant multivibrator 104 is triggered by the output pulse from shift register 100 stage RJ, a second output from multivibrator 104 supplies energy to the reset input terminal of a flip-flip circuit 116.

The second input to AND circuit 117 is fulfilled from a NOR circuit 118, which in turn receives energy from the output of AND circuit 107 when a switch 119 is closed. The input signal supplied to NOR circuit 118 also fulfills one input of a NOR circuit 120 having a plurality of inputs, here seven, in order to accommodate signals from each of AND circuits 107–113. Output energy from AND circuit 117 fulfills the second input to AND circuits 108–113. Output energy from NOR circuit 120 fulfills the second output to AND circuit 115.

Output signals from AND circuits 105 and 106 set flip-flip circuits 121 and 122, respectively. Reset signals for both flip-flip circuits 121 and 122 are supplied from monostable multivibrator 104 whenever the multivibrator starts its cycle of operation after having been triggered by a voltage pulse from shift register 100 output stage RJ. Flip-flip circuit 116 is set by output energy from AND circuit 113. When the decoder is used in a traffic control system, offset signals are preferably supplied from AND circuits 107–113 and 115, while split signals are preferably supplied from flip-flip circuits 121 and 122 whenever the flip-flops are in a set condition, and a reset signal is supplied from multivibrator 104 at the start of its operating cycle, in order to operate a traffic signal offset and split control system, such as that described in J. H. Auer, Jr. and J. P. Huffman Patent No. 3,252,134. In addition, outputs from flip-flip circuit 116 may be supplied to appropriate light offset input terminals of a local controller, such as that described in N. A. Bolton Patent No. 3,274,547, in order to retain a light offset at the controller. These input terminals are illustrated and described in the aforementioned Bolton application.

In operation, assume A pulses are being continuously received from the encoder of FIG. 1A. Until a predesignated A pulse is received, no information is transferred into the stages of shift register 100. In the system disclosed, this predesignated pulse is pulse 80, shown in waveform 2A of FIG. 2. Furthermore, assume the B pulse code received by the decoder of FIG. 1B is that illustrated by waveform 2C of FIG. 2, wherein presence of B pulses is indicated by solid-line pulses and absence of B pulses is indicated by dotted-line pulses.

Until arrival of the "tag" bit at the decoder, flip-flip circuit 102 is in a reset condition, maintaining one input of two-input AND circuit 101 deenergized. Hence, A pulses are not received by shift register 100 until after the tag bit is received.

Receipt of the first B pulse, which comprises the "tag" bit, causes a binary ONE to be coupled directly into shift register 100 stage RA. This "tag" pulse also sets flip-flip circuit 102, thereby providing an output pulse from monostable multivibrator 103 to stage RA of shift register 100. This obviates the possibility that the first B pulse might be applied to stage RA during the time in which a reset signal is supplied to the shift register from monostable multivibrator 103 and thereby be prevented from being accepted by stage RA.

When multivibrator 103 is triggered, a first pulse is produced immediately, and is used for resetting shift register 100 to a condition in which no information is stored therein. Upon completion of a full cycle of operation by the multivibrator, the period of which is dependent upon the multivibrator time constant, a second pulse is produced. This second pulse inserts the "tag" bit into the shift register.

Prior to receipt of the "tag" bit by shift register stage RA, flip-flip circuit 102 energizes one input to AND circuit 101. The next-occurring A pulse then advances the "tag" bit from stage RA to stage RB. In the specific instance illustrated, the "tag" bit is advanced by A pulse 82.

Subsequent to A pulse 82, but prior to A pulse 84, the next-occurring B pulse, if any, causes a binary ONE to be applied directly to stage RA, since flip-flip circuit 102 remains in the set condition. If no B pulse occurs between A pulses 82 and 84, a binary ZERO is thereby supplied to stage RA. Since this is the condition illustrated in FIG. 2, a binary ZERO now exists in stage RA, while a binary ONE exists in stage RB. A pulse 84, which is the next-occurring A pulse, then advances the ONE to stage RC and the ZERO to stage RB.

Subsequent to A pulse 84, but prior to A pulse 86, B pulse 2 occurs. As illustrated in FIG. 2, this pulse is present; hence, a binary ONE is supplied to shift register stage RA, and subsequently, A pulse 86 advances the code stored in shift register stages RA, RB and RC to stages RB, RC and RD respectively. At this time, stage RB contains a binary ONE, stage RC contains a binary ZERO and stage RD contains a binary ONE. In this manner, a B code is advanced serially into shift register 100, until the "tag" bit reaches stage RJ.

The reason for interlacing the A and B pulses to avoid overlapping should now be obvious, since information must be transferred into shift register 100 stage RA by presence or absence of a B pulse before it can be advanced to subsequent stages of the shift register by an A pulse.

For the waveforms illustrated in FIG. 2, A pulse 98 causes the "tag" bit to shift into stage RJ. A pulse 100 or 00 then causes the "tag" bit to be shifted serially out of stage RJ, and the information indicated by absence or presence of B pulses 1–9 to be advanced into shift register stages RJ–RB, respectively. The serial transfer of the "tag" bit out of stage RJ by A pulse 100 (which is also pulse 00 of the next-succeeding train of A pulses) resets flip-flip circuit 102 so as to deenergize the input supplied to AND circuit 101 from the flip-flip circuit, and also triggers monostable multivibrator 104.

The pulse which is serially shifted out of stage RJ also triggers monostable multivibrator 104, which operates through a cycle of predetermined duration, depending upon the multivibrator time constant. At the start of this cycle, flip-flip circuits 116, 121 and 122 are reset by a first output pulse. In addition, the offset counter of the traffic signal offset and split control system, such as that described in aforementioned application, is reset to zero. At the end of the cycle, a second output pulse is coupled to one input of each of AND circuits 105, 106, 107, and 115. At this instant, the portion of the B code stored in shift register stages RB and RC is transferred through AND circuits 105 and 106 respectively, to flip-flip circuits 121 and 122 respectively. A binary ONE stored in stages RB thus produces an output signal from flip-flip circuit 121, while a binary ONE stored in stage RC produces output energy from flip-flip circuit 122. Similarly, a binary ZERO stored in either of stages RB or RC produces no output energy from the corresponding flip-flip circuit energized therefrom. In this fashion, remote split selection signals supplied to the traffic signal offset and split control system, such as that described in aforementioned application Ser. No. 316,858, are controlled by the portion of the B code stored in shift register stages RB and RC immediately subsequent to occurrence of A pulses 100 or 00.

Shift register stage RD preferably contains special offset information. Readout of stage RD is achieved by the pulse produced by multivibrator 104 at the end of the multivibrator time constant, which energizes one input to AND circuit 107. If special offset switch 119 is in the "on", or closed position, upon occurrence of the pulse produced at the end of the multivibrator time constant, the information stored in shift register stage RD is read out of the shift register to the traffic signal offset and split control system. However, if special offset switch 119 is in the "off," or open position, then even though the B code may call for special offset, this information is not sent to the offset and split control system when readout occurs; instead, NOR circuit 118 provides output energy to one input of AND circuit 117, since the NOR circuit input is deenergized. Under these conditions, the pulse appearing at the output of monostable multivibrator 104 upon completion of the multivibrator time constant fulfills the second input to AND circuit 117, in turn energizing one input to each of AND circuits 108–112. Information stored in shift register stages RE–RJ is thereby transferred to the traffic signal offset and split control system, providing offset information hereto.

In event the B code is received from the encoder, although for some reason no offset information is received, a standby, or system zero offset is called for. This is achieved by coupling each offset output lead to a separate input of NOR circuit 120. Output energy is thus provided from the NOR circuit whenever no offset output lead is energized. Under these conditions, at the end of each monostable multivibrator 104 operating cycle, which necessarily requires receipt of a "tag" bit by the decoder, both inputs to AND circuit 115 are fulfilled, and a standby is sent to the traffic signal offset and split control system from AND circuit 115.

Light offset signals are stored in flip-flip circuit 116. This flip-flip is switched into its set condition whenever an output signal is provided from AND circuit 113, which represents a light offset signal. The flip-flip is retained in its set condition, until start of a new monostable multivibrator 104 operating cycle, at which time an output pulse from the multivibrator resets flip-flip 116, removing the light offset information from the flip-flip output leads. If the next pulse train received by the decoder also calls for a light offset, the flip-flip is again switched into its set condition by output energy from AND circuit 113, and once again a light offset signal is steadily provided from flip-flip 116. As already noted, output energy from the flip-flip is coupled directly into a traffic signal controller such as that shown in aforementioned Bolton application Ser. No. 319,761 and provides a steady light offset signal thereto.

Thus, there has been shown a hybrid code communication system for transmission of data, via conducting or radiant energy means, in the form of a PFM signal and a PCM signal. Shift register encoding and decoding means are utilized in order to permit signals, such as traffic signal control information, to be transmitted over long distances, obviating the necessity of utilizing multiconductor cable for signal transmission.

Figures 3, 4, 5:
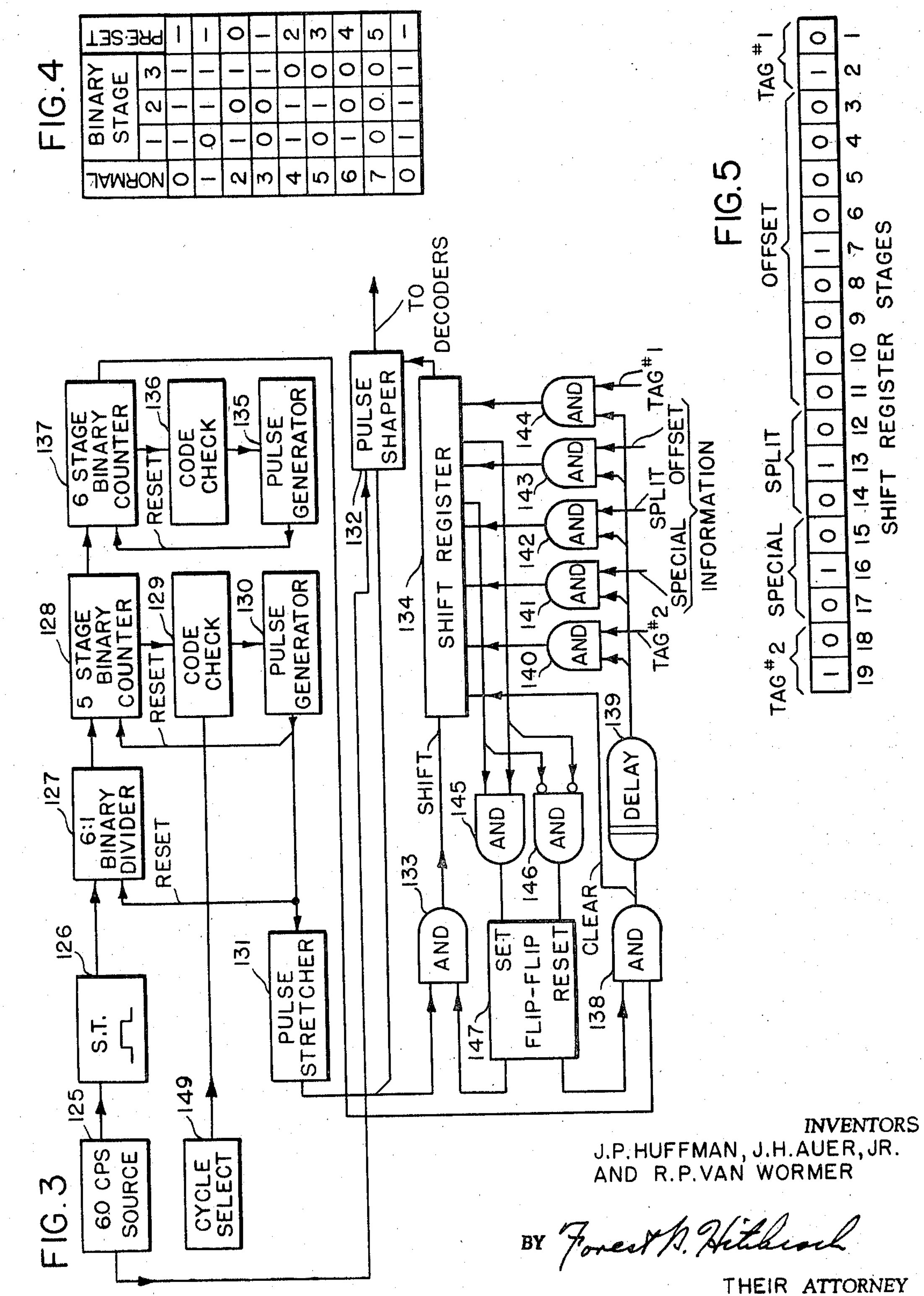
FIG. 3 is a block diagram of a second embodiment of the communication system encoder circuit.
FIG. 4 is a table of binary data useful in explaining the operation of the encoder of FIG. 3.
FIG. 5 is a further display of binary data useful in explaining the operation of the encoder of FIG. 3.

In accordance with the second embodiment of this invention FIGS. 3 through 7 are considered. The encoder of FIG. 3 is located at the central communication office and provides for the transmission of the traffic signal control information to the remotely located decoders. A sixty cycle per second signal source 125, which may comprise any available sixty cycle generator or line, provides the basic timing for the system. A Schmitt Trigger circuit 126 in combination with a six to one binary divider 127 established a basic timing pulse rate of 10 per second.

A cycle select unit 149 combined with a five stage binary count 128, a code check unit 129, and a pulse generator unit 130, establish the desired operational cycle duration in conjunction with the basic timing pulses provided by the aforementioned timing circuitry. Further, this combination provides the system drive pulses which are of fixed number during any operational cycle. As in the first embodiment there are provided fifty drive pulses giving a resolution of two percent for any operational cycle. Although this number may be increased to attain a higher resolution, it is found that in most instances fifty pulses is sufficient for system operation.

A six stage binary counter 137, a code check unit 136, and a pulse generator unit 135 demarcate the complete operational cycle by producing an output pulse upon receipt of the fiftieth drive pulse indicated by the five stage binary counter 128. It is this demarcating pulse or presync pulse, as it is referred to in this application, that establishes the time for entry and transmission of the traffic control data. An AND circuit 138 connected to a delay circuit 139, and additional AND circuitry 140 through 144 provide the means for entering the specific data to be transmitted into shift register 134 from an informational source. The AND circuit 138 which basically controls the entrance of the information into the shift register 134 requires an output established by the operation of flip-flip 147, a bistable multivibrator, and AND circuits 145 and 146 in order to be satisfied. The AND circuitry senses the existence or absence of information in the offset and split sections of shift register 134 and allows information to be entered only when there is an absence of the signal in the shift register and information to be serially transmitted out of the shift register 134 only when specific information is found to be present. The serial shifting of the shift register 134 is controlled by the operation of AND circuit 133 the inputs to which comprise another output of flip-flip 147 and one output of a pulse stretcher 131. The pulse stretcher 131 serves to lengthen the duration of the drive pulses to that necessary for system operation.

The same serial output of the pulse stretcher 131 is conducted to a pulse shaper unit 132. The second input to the pulse shaper 132 is provided by the shift register 134. The combination of these two inputs in the pulse shaper 132 establishes a long duration pulse approximately twice the length of a normal pulse whenever other than a zero information bit is transmitted to the last stage of the shift register 134, while providing a normal short duration pulse as established by pulse stretcher 131 whenever a zero or clear state is established in the last stage shift register 134.

The foregoing equipment organization provides all those functions needed for the establishing of cycle timing and the entry and transmission of traffic control information. To enable a clearer and incisive understanding of this encoder a more detailed functional description of the equipment is presented infra.

The sixty cycle source 125 as previously indicated may be any available sixty cycle generator, the Schmitt Trigger circuit 126, a regenerative squaring device, provides essentially square wave pulses of repetition rate commensurate with the sixty cycle source. The output of the Schmitt Trigger 126 is in turn sensed by a six to one binary divider 127 comprising three stages, which would normally provide an eight to one division, as indicated by the table of FIG. 4. However, each time the counter attains a full count of energization of all three stages, internal wiring provides for the registering of a two count. This initial set of the counter effectively renders the normally eight to one divider a six to one divider and is demonstrated or can be seen from the information presented in the table of FIG. 4. Inspection of FIG. 4 shows that normally a count of two is required for the first and third stages of the counter to be energized. While under the influence of the internal wiring, the same energization state is achieved at a zero count. It is further noted that as the count provides the normal count maintains an offset of two with respect to the revised operation. When the revised six count is received, the divider 127 is returned to its normal two count condition. This six to one divider 127 operating on a sixty cycle per second output pulse from the Schmitt Trigger, obviously provides a pulse every tenth of a second or as previously stated the basic timing rate of the system.

The output of the divider 127 is then conducted to the five stage binary counter 128. As in normal counter operation the various stages of this binary counter change energy levels in accordance with the pulse count attained. At any given count a particular code pattern is present in the counter and provides a singular characteristic useful in the recognition of the particular count. A code check unit 129 contains the necessary logic circuitry to enable recognition of desired code patterns in the five stage binary counter 128. This code check unit 129 may be selectively modified by a cycle select unit 149 to select a desired count. The code check unit 129 may consist as in this embodiment of the invention of seven multi-position four-pole rotary switches each of which can be wired to be capable of checking a desired code. In this particular instance the cycle select 149 selects one of six of the switches to check the code while the seventh is utilized for a manual selection of cycle rates. One skilled in the art can easily determine the number of rates and of course the possible code combinations available from the disclosed circuitry for desired system operation.

A pulse generator 130 is actuated by the recognition of the desired code by the code check unit 129 and upon actuation initiates a pulse which resets the five stage binary counter 128 and causes the binary counter to produce an output pulse. The output pulses of the generator 130 in addition to resetting the five stage binary counter 128 also reset the six to one binary divider 127, and comprise the system drive pulses. The reset pulse for the six to one binary divider 127 assures that the system maintains the .1 of a second cycle rate, and any error which may be introduced by a pulse present in the divider due to noise, etc. at the beginning of the new count cycle is cleared upon reset.

Review of the basic timing and pulse code recognition circuitry as described, indicates that the five stage binary counter 128 provides a pulse output at a repetition rate dependent upon the system rate determined by the cycle select unit 149. Thus if it is desired that a fifty second overall cycle duration be achieved the code check unit 129 will initiate an output from the pulse generator 130 and from the five stage binary counter 128 once every second or upon the recognition of a count of ten output pulses derived from the six to one binary divider 127.

The six stage binary counter 137, the code check 136, and the pulse generator 135 operate in an entirely analogous manner to units 128, 129 and 130 respectively. The code check unit 136 is normally wired or arranged to recognize a fixed count of fifty code pattern. This recognition resets the six stage binary counter and generates the aforementioned presync or output pulse from the six stage binary counter 137 upon the occurrence of every fifty output pulses generated or derived from the five stage binary counter 128. It is noted that the overall cycle length may be readily modified by allowing the code check circuit 136 to recognize some other distinctive pattern correlative to a desired count. It is similarly seen that the number of pulses in any given cycle, as well as the cycle length, may be changed by coordinated modification of the code check units associated with both the five stage 128 and six stage 137 binary counters.

The generation of an output pulse from the six stage binary counter 137 initiates the presync pulse which completes one input to AND circuit 138. The output of AND circuit 138 is conducted through a time delay unit 139 to one input of each of AND circuits 140 through 144. The outputs of AND circuits 140 through 144 connect to the various stages of the shift register 134 and provide the energization signals indicative of the information to be transmitted. An undelayed output of AND circuit 138 is also conducted to the shift register 134 and provides for clearing of all the stages, this assures that prior to the entrance of information into the register it will be entirely cleared of any extraneous binary data.

In each operational cycle it is a requisite of any feasible and practical traffic control system now used, that both offset and split information be transmitted, thus the presence of both split and offset information is a necessary indication of a complete message while the absence of either or both indicates the contrary. To assure that only messages having both offset and split information are transmitted, the outputs of the stages intended for the storing of offset and split information are conducted to a read-in AND circuit 145. Further, to assure that all data entered into the shift register has been transmitted the same stages are conducted to shift pulse AND circuit 146. The AND circuit 145 produces an enabling output voltage when both offset and split indication are present, while AND circuit 146 provides an enabling signal only when neither offset nor split information is present. The outputs of AND circuits 145 and 146 control the set and reset inputs of flip-flip 147 respectively. Of course, circuits 145 and 146 may be easily modified to be satisfied by any other information inputs necessary for each message. Therefore when no information is present in the offset and split stages the flip-flip circuit 147 is reset and one of its outputs correlative to the reset condition provides the second completing input to AND circuit 138. This results in clearing the shift register of any information and after the predetermined delay imposed by time delay circuit 139 enters the new information message into the shift register 134. Thus whenever the six stage binary counter 137 generates a presync pulse and the flip-flip circuit 147 is in its reset condition the shift register 134 is cleared and new information entered.

A typical message entered into the shift register comprises binary data as indicated in FIG. 5. FIG. 5 shows a shift register 134 consisting of nineteen independent stages. The first two stages are reserved for a tag bit, the second stage always being energized to a one condition and the first to a zero condition upon the entry of a new message. A second tag bit is entered into stages 18 and 19 with stage 18 always being set to zero and stage 19 to one; the reasons for this tag bit orientation will become obvious upon later discussion. Stages 3 through 11 provide storage for the entry of any of nine desired offset settings while stages 12 through 14 can be set to any of three split conditions. Stages 15 through 17 are reserved for any special function information adaptable to control of the local traffic signal control during any given operational cycle. A message of this typical format is entered into the shift register 134 each time AND circuit 138 is completed.

The set output of flip-flip 147 is conducted to an AND circuit 133, the output of this AND circuit 133 provides the shift pulse inputs to the shift register 134 and causes the information stored in the register to shift one stage upon the occurrence of each pulse. The second input to the AND circuit 133 required to generate an output pulse or shift pulse is provided by pulse stretcher unit 131. As previously described this unit is dependent upon the drive pulses generated by the pulse generator 130 and provides the desired normal pulse duration for the system. The pulse stretcher 131 may comprise a flip-flop monostable multivibrator or any other well known circuit adaptable to producing a desired length pulse. At any time AND circuit 145 senses both offset and split information in the shift register which should occur after each read-in, the flip-flip 147 is placed in a set condition and provides the output voltage necessary to complete AND circuit 133. This as stated supra results in providing the necessary shift pulses for transmitting the information to a decoder. As information contained in stages of the register is shifted into the last stage, the output of the register connected to such last stage controls the pulse shaper unit 132.

The pulse shaper unit 132 dependent upon the state of the last register stage either transmits a normal duration pulse length in conjunction with the receipt of each output pulse from the pulse stretcher 131 or produces a long duration pulse if the last stage is energized or in a ONE condition. The output of the shaper unit 132 is then connected to the transmission channel for sending of the information in serial form to the decoder circuitry; in this embodiment this channel comprises a two-wire conductor but may in a given situation employ a radio frequency or other communication channel.

Figure 6:
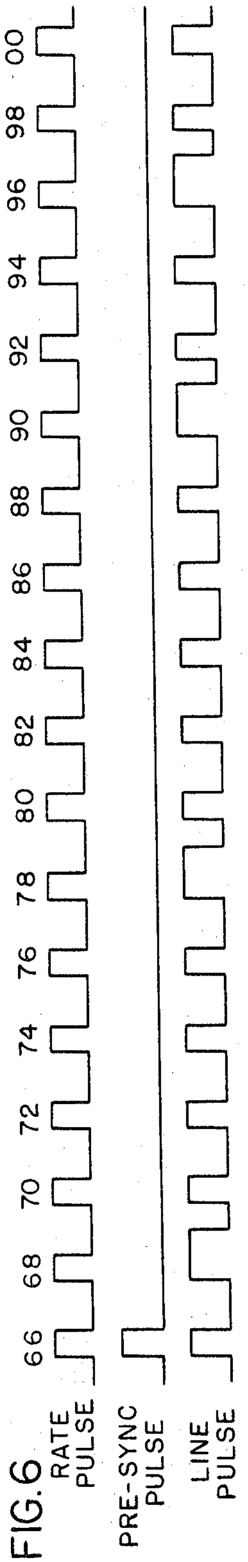
FIG. 6 is a display of a train of binary pulses helpful in the explanation of the operation of the communication system.

A typical message is serially transmitted out of the shift register 134 as indicated in FIG. 6. The serial wave form of FIG. 6 can be correlated to the data demonstrated by the binary settings of the various shift register stages in accordance with the message of FIG. 5. The numbers relative to each rate pulse as indicated in FIG. 6 are indicative of a pulse count in an operational cycle capable of encompassing a total of one hundred pulses per-cycle but needing only fifty pulses per cycle in accordance with practical system resolution. The numbering is thus commensurate with that disclosed in the first embodiment of the invention wherein every other pulse is deleted to provide the necessary timing sequence for the transmission of the information message. The rate pulses are indicative of the output of pulse stretcher 131.

The presync pulse occurs only once and as discussed supra, conditions the necessary circuitry for entering of the information measage. The leading edge of the line pulses occur at the same time as leading edge of the rate pulses but the duration as disclosed supra varies with the information present in the shift register 134, a short duration or normal pulse length establishing a zero binary condition while a long duration (approximately twice the length) indicates a binary one condition. In the system under consideration a normal duration comprises a 200 millisecond pulse and a long duration comprises a 450 millisecond pulse.

Upon the occurrence of the presync pulse the shift register 134 is cleared and new information is entered. Upon the occurrence of pulse 68 or the second rate pulse shown, the first tag bit contained in stage 2 is shifted to the 1st stage and conditions pulse shaper 132 to produce a long duration pulse. The next four pulses are all of short duration as determined by the zero setting of shift register stages 3 through 6. The seventh line pulse contemporaneous with drive pulse 78 is of long duration since the information initially set in stage 7 comprised a binary one or energized state. The remaining line pulses are similarly coordinated with the information message. The last pulse which ordinarily would comprise a one or long duration due to the presence of the second tag bit comprises a short duration pulse due to the fact that the tag bit No. 2 encompasses two stages of the register and thus presents a zero condition to the last stage and not a ONE. Further since the No. 2 tag bit when entering the next to last stage or stage 2 is now clear of the split and offset stages, the read-in AND circuit 146 is completed and generates the reset pulse for flip-flop 147, which in turn removes one of the inputs from AND circuit 133, preventing the further generation of shift pulses. This ends the serial shifting and transmission of the information message.

The value of the second tag bit should now be obvious in that it presents a means for determining the completion of message transmission and stopping the continued shifting of the register, if this were not a feature of the encoder it is possible that a one bit could be entered into the last stage of the shift register and a continued transmission of long pulses would ensue, thereby preventing recognition of message completion. The importance of this will become apparent in discussion of the decoder portion of this system.

For a greater understanding the broad operation of the encoder is now discussed. A 10 pulse per second basic timing pulse train is established, and the cycle select unit 149 is either manually or remotely controlled to provide the desired rate for the operational cycle. A pulse generator 130 in coordination with code check unit 129 and counter 128 then provide the system drive pulses dependent upon the cycle rate selected. The six stage binary counter 137, code check unit 136, and pulse generator 135 then demarcate a fixed number of pulses. Thusly, for a given arterial traffic control situation, the operational cycle length and rate is selected and generated.

Ancillary equipment responsive to traffic conditions computes the traffic control information, viz. special functions, split and offset to maintain the smooth flow of traffic and upon the occurrence of the desired count in this instance fifty in the sixth stage binary counter 137, this information is read into the shift register 134. Continued serial shifting of this information and its transmission through pulse shaper 132 to the decoder is provided through specific AND logic circuitry upon the occurrence or in conjunction with the occurrence of each drive pulse and continues until the message is completely transmitted. The background zero time of the system is coordinated with the rate pulse following the last information pulse shifted from the register and is thereby repeated every fifty drive pulses as determined by the six stage binary counter 137 and code check unit 136. The transmission of successive messages during successive operational cycles continues in coordination with the drive pulses and occurs upon a specific count in each cycle as established by the code check unit 136.

Figure 7:
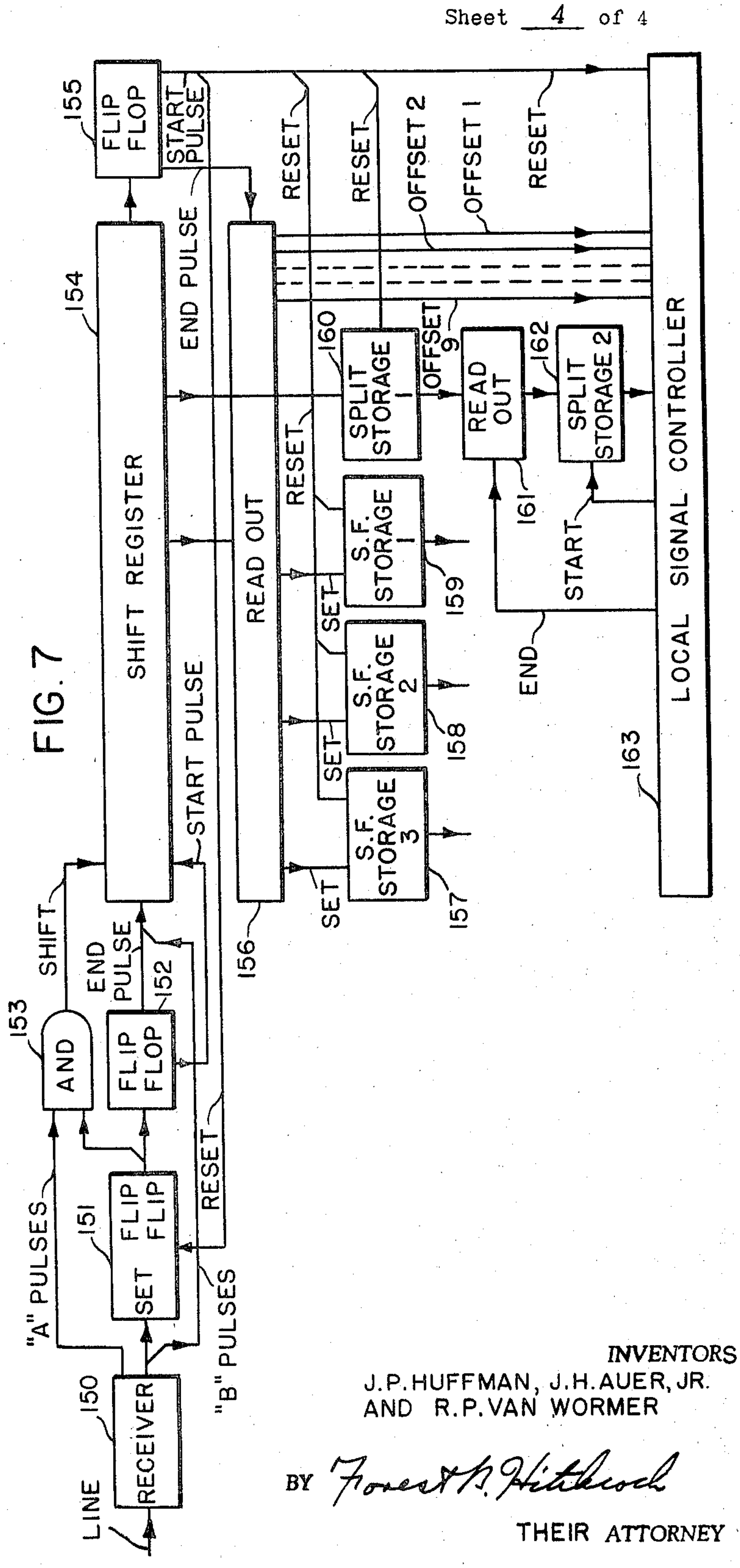
FIG. 7 is a block diagram of a second embodiment of the communication system decoder circuitry to be used with the encoder of FIG. 3.

The decoding equipment organization of this embodiment is shown in FIG. 7. Again referring to the line pulse train of FIG. 6 it can be seen that the receiver unit 150 senses each line pulse and through the logic functions of flip-flop unit 151, flip-flop unit 152, and AND circuit 153 results in entering and shifting the information message within the shift register 154. When in receipt of an entire information message which fact is indicated by the registration of tag bit No. 1 in the last stage of shift register 154, flip-flop circuit 155 in conjunction with read-out device 156 results in clearing the storage equipment and reading in the new information from the shift register 154. It also results in clearing the information read-in logic circuitry prior to the commencement of a new information message. The local signal controller 163 upon the generation of the read-in signal receives the specific offset information as well as the split information stored in split storage and read-out units 160, 161 and 162 and the special function information as contained in units 157, 158 and 159.

In detail and referring to the line pulse train of FIG. 6 the receiver 150 which may comprise any of a number of units well known in the art receives each transmitted pulse in time sequence. Within the receiver 150 are contained two timing circuits which may comprise RC networks in combination with unijunction transistors or other well known circuitry capable of producing an output signal upon the occurrence of a pulse greater than a particular duration. One of these timing circuits is configured to produce a pulse output whenever an input signal of substantially normal pulse length is received while a second timer only produces a pulse output upon the receipt of an input signal having a duration substantially that of the long duration pulses indicative of a binary ONE condition. Thus the receiver 150 provides a pulse output hereinafter referred to as A pulse for each line pulse received whether of long or short duration which A pulse is analogous to the A pulse of the 1st embodiment, and also provides a second train of pulses hereinafter referred to as B pulses, upon the receipt of any long duration pulse, the B pulses necessarily occur after the A pulse. One inherent advantage in this type of system is its noise rejection characteristic, normally noise inputs are of short transient duration and can neither actuate the first or second timer and therefore result in no pulse output from the receiver 150.

The B pulse train received in coordination with rate pulse 68 is always the first message pulse and is always a long duration pulse as required by the presence in each message of the No. 1 tag bit. This provides both an A pulse and a B pulse from the receiver unit 150. The B pulse is conducted to flip-flip 151 and places it in a set condition. The output of flip-flip 151 in turn actuates flip-flop 152 resulting in the generation of a start pulse and an end pulse which is characteristic of the monostable multivibrator circuitry utilized in this device. The start pulse of flip-flop 152 is conducted to the shift register 154 and results in clearing all stages of any information which may be stored. The end pulse which occurs at a given interval after the start pulse, depending upon the circuit parameters of flip-flop 152, is conducted to the first input stage of shift register 154 and results in the entry of a ONE bit.

Prior to the entry of the ONE bit the A pulse generated prior to the B pulse completes one input of an AND circuit 153, the second input of this circuit is provided by the output of the flip-flip 151, which occurs subsequently to the time of the A pulse. With the occurrence of the first tag bit pulse AND circuit 153 is completed and provides a shift pulse to the shift register 154, at that instant, however, the shift register contains no information and since the entry of the tag bit into the register must await the time constant of flip-flop 152 no information is shifted therein.

After the initial entry of the tag bit upon the occurrence of each subsequent output from AND circuit 153, which will not occur commensurate with the receipt of each line pulse, the tag bit is serially shifted within the register. Upon the occurrence of rate pulse 78 the tag bit is entered into stage 6 of the shift register. At that same time the second wide or long duration pulse indicating a binary ONE is received and a B pulse is generated. As shown in the diagram, the B pulses as well as being conducted to flip-flip 151, are parallel conducted to the input of the shift register 154 and energize the first stage of the shift register. This serially registration and shifting process continues until pulse 98 at which time the tag bit is entered into the last stage of the shift register. In conjuncion with the next received line pulse, the background 0 time pulse, the ONE information of the last stage is shifted into the flip-flop 155, resulting in the generation of a start pulse and an end pulse. The start pulse is conducted to a number of units and is essentially a reset pulse. Flip-flip 151 is reset by this start pulse and its resetting removes one input from AND circuit 153 preventing continued shifting of information within the shift register. The resetting of flip-flop 151 and the resultant cessation in shifting is indicative of the complete message having been received in shift register 154.

At the same time that flip-flip 151 is reset all of the storage devices connected with the utilization equipment are also reset. This means that storage devices 157 through 159 connected with the special function information are reset, and that the storage devices, viz., split storage 160 and the offset storages within the local signal controller are also reset. The function of the resetting is to clear the storage device of old information so they may be set to the energization level indicated by the readout device 156. Thus after the occurrence of the start pulse from flip-flop 155 all information storage devices are cleared or in a zero condition and the message is completely entered into the shift register 154. Upon the end of the start pulse and in accordance with the time constant or delay of the flip-flop 155 a second or end pulse is generated. The end pulse is conducted to the readout unit 156 and results in energizing the readout stages in accordance wtih the information then present in the shift register 154, this readout energization causes setting of the various storage devices previously referred to in accordance with either a binary ONE or zero condition, as designated by the readout 156. The local controller is then actuated in accordance with the information contained in storage.

In addition to the split storage 160, there is further connected with split information a read-out unit 161 and a second split storage 162 both serially connected with the split storage 160. In a traffic control system it is essential that the split information only be changed contemporaneously with the occurrence of local zero, i.e. the zero time of the local signal controller as determined by the offset information. This demands that the information received upon the occurrence of background zero, viz., the time when the complete message is received in the shift register 154, be temporarily stored until the occurrence of local zero. At the time the local zero count occurs a start pulse is generated in similar fashion to that generated by flip-flop 155 and results in clearing the information then present in the split storage 162. Again after a short delay commensurate with the delay time of a flip-flop an end pulse is generated. This end pulse enters the new information from split storage 160 into the readout device 161, which in turn changes the information in split storage 162 to agree with the split timing data transmitted in the last received message.

Again considering the overall system, the broad practical operation of the decoder will be discussed in terms of a typical message being received from the encoder. The message format will be as depicted in FIGS. 5 and 6. The receiver 150 is connected to a telephone line transmitting bursts of sixty cycle per second sine waves having a duration of either 200 or 450 milliseconds in accordance with the information message. Therefore a narrow pulse consists of approximately twelve cycles and a wide pulse consists of approximately twenty-five cycles. Since sixty cycle frequency is used by the pulse generator there is very little line attenuation and also since low frequency is used it is permissible to use high level signals in the order of 100 volts R.M.S. The receiver 150 is, however, capable of operating on much lower level signals and therefore may have large input reisstors in series with it presenting a large input impedance and making it possible to operate many receivers in parallel on the party line. In fact, it is possible for one or more decoders to short out without deteriorating the operation of the other parallel decoders.

In accordance with the operation of receiver 150 previously described, A pulses are continuously generated with the receipt of each line pulse and B pulses are generated by the receipt of each long duration pulse. The first pulse which is always a B pulse, sets flip-flip 151, flip-flop 152, and completes one input to AND circuit 153. The generation of the first pulse from flip-flop 152 clears the shift register and the generation of the end pulse of flip-flop 152 enters the first ONE bit. Thereafter since flip-flip 151 is set each A pulse that occurs produces an output from AND circuit 153 thereby serially shifting any information in the shift register through the various stages.

Inspection of FIG. 6 indicates that the first, sixth, twelfth, and fifteenth message bits are ONES, and all others are zeroes. Thus, upon occurrence of line pulse following entry of the tag bit or the first binary ONE into the last stage of shift register 154, the various stages of the shift register will be energized in accordance with the information message. At this time the tag bit is shifted out of the register and initiates flip-flop 155, generating the start pulse which causes the resetting of the utilization storage devices and flip-flip 151. The extinguishing of output from flip-flip 151 removes one input to AND circuit 153 and results in preventing continued shifting of shift register 154 locking the then completed message into the shift register 154. After the generation of the start pulse, the end pulse then reads out the information into the storage devices and at a later time another pair of start and end pulses from the local controller puts the new split information into the local controller. Operation of the local signal controller is thereafter dictated by the information contained in the new message.

After a count in the six stage binary counter 137 of thirty-two drive pulses, a new presync pulse is generated by the six stage binary counter 137 contemporaneously with the occurrence of rate pulse 66, the presync pulse then initiates the entry and transmission of a new message and the decoder repeats the receiving and registering operation just presented.

The analysis of the encoder of FIG. 3 and the decoder of FIG. 7 presents a second organization of a complete code communication system embodying the invention of this application. Both forms provide for the transmission of selectively variable cycle rate offset, split and special function data, the latter three being transmitted at a predetermined time in each successive operational cycle. In each organization first accumulating means are controlled to register new information at the predetermined time and second accumulating means are responsive to such new information as it is serially advanced out of the first accumulating means. In each embodiment the read-out of information from the second accumulating means and its subsequent entry into the local signal controller is permitted only upon the receipt of the complete transmitted message.

It is to be understood that the embodiments are shown to facilitate an analysis and understanding of the invention and that such invention is not limited to these specific embodiments but may encompass those modifications and changes apparent or obvious to one skilled in the art.

What we claim is:

1. Apparatus for communicating traffic control data during an operational cycle to at least one signal controller comprising:

first accumulating means for registering the data;

means transferring the data to the first accumulating means at a predetermined time in the operational cycle;

second accumulating means remotely located responsive to the data registered in the first accumulating means; and read-out means for transferring the data from the second accumulating means to the signal controller whenever the entire data is registered in the second accumulating means.

2. The apparatus of claim 1 wherein the means for transferring the data to the first accumulating means comprises:

means generating drive pulses during the operational cycle;

a counter responsive to the drive pulses;

means responsive to the counting means for designating a desired drive pulse count relative to the predetermined time; and the means for transferring the data is responsive to the means designating the desired count.

3. The apparatus of claim 2 wherein a fixed number of drive pulses is generated during each operational cycle, the counter is a binary counter, and the means responsive to the counter designates the desired drive pulse count by recognizing the energization levels of the stages of the binary counter corresponding to the desired pulse count.

4. The apparatus of claim 3 wherein the means generating a fixed number of pulses during the operational cycle comprises, a second binary counter responsive to a continuing train of basic timing pulses, means for selecting a desired time interval, code check means responsive to the energization levels of the stages of the second binary counter and controlled by the time interval select means to recognize a particular pattern of energization of the second binary counter stages corresponding to the selected time interval, and pulse generating means actuated by the code check means to initiate a drive pulse and reset the second binary counter whenever the corresponding code pattern is recognized.

5. Claim 4 wherein the basic timing pulses are generated by pulse generating means driven by a sixty cycle signal.

6. The apparatus of claim 2 including, means responsive to the drive pulses for generating shift pulses to serially advance the data out of the first accumulating means, and coupling circuitry responsive to the drive pulse for transmitting the output pulse message including pulses indicative of the data to the second accumulating means.

7. The apparatus of claim 6 wherein the first and second accumulating means includes first and second binary shift registers respectively for registration of the data.

8. The apparatus of claim 7 wherein: the means for transferring data into the first accumulating means includes, read-in AND logic circuit means for transferring the data only when certain data is not present in the first shift register and upon recognition of the desired drive pulse count; and the shift pulse generating means includes shift-pulse AND logic circuit means for permitting generation of shift pulses only when the certain data is present in the first accumulating means.

9. The apparatus of claim 8 wherein first and second tag bits are entered into the first shift register at the beginning and end of the traffic control data respectively, and the generation of shift pulses is inhibited when the second tag bit clears the register stages associated with the certain data required to satisfy the shift AND logic circuit means.

10. The apparatus of claim 8 wherein the read-in AND logic circuit means includes, means for clearing the first shift register, and delay means for preventing entering of the data until after clearing.

11. The apparatus of claim 7 wherein the coupling circuitry includes pulse shaping means responsive to the drive pulses for transmitting output pulses having a duration relative to the value of the data being serially advanced out of the first shift register.

12. The apparatus of claim 11 wherein a one bit initiates a relatively long duration pulse, while a zero bit or no bit initiates a normal duration pulse.

13. The apparatus of claim 12 wherein the coupling circuitry includes a pulse receiver responsive to the transmitted output pulses having, timer means generating a first pulse relative to each transmitted output pulse and a second pulse on the receipt of each relatively long duration output pulse, the second pulse being produced at a time subsequent to the first pulse and prior to the next successive transmitted output pulse.

14. The apparatus of claim 7 wherein the second accumulating means includes second shift pulse means having logic circuit means responsive to the transmitted output pulses for generating shift pulses to serially advance the data into the second shift register only after the receipt of the initial data bit advanced out of the first shift register.

15. The apparatus of claim 14 wherein the logic circuit means comprises AND circuit means.

16. The apparatus of claim 14 wherein the seconc accumulating means includes:

a first bistable multivibrator actuated when the initia data bit advanced out of the first shift register i shifted out of the last stage of the second shif register; and a monostable multivibrator responsive to the firs multivibrator when actuated by the initial data b advanced out of the first shift register for producin a start pulse and an end pulse, the start pulse clea ing the second shift register and the end pulse settin the first stage of the second shift register in accor ance with the value of the initial data bit.

17. The apparatus of claim 14 wherein the reado means includes means responsive to the initial data b being advanced out of the last stage of the second shi register generating a start pulse and an end pulse, t start pulse clearing data storage units and the subseque end pulse setting the data storage units in accordance wi the data then in the second register.

18. The apparatus of claim 17 wherein the means co prises a monostable multivibrator and wherein, the rea out means further includes a plurality of AND circu responsive to the respective data in each stage of t second shift register, which AND circuits produce an o put when satisfied by the end pulse and a predetermi bit value in the respective register stage thereby sett the respective storage unit to the bit value.

19. The apparatus of claim 7 wherein the me responsive to the counting means designates a sec count relative to a predetermined data message length and which means controls the shift pulse generating means to commence generation of shift pulses upon the occurrence of the first designated count and to cease upon the occurrence of the second subsequent designated count.

20. The apparatus of claim 19 wherein the means for transferring the data to the first accumulating means comprises first and second logic circuit means satisfied by the designation of the first count and second count respectively, the first logic means providing for clearing all data from the first accumulating means prior to the transfer of the data; and wherein the shift pulse generator includes logic circuit means controlled by the first logic means to generate the shift pulses upon the occurrence of each drive pulse after the first count and to cease generation upon the occurrence of the second designated count.

21. Apparatus of claim 20 wherein the logic means comprises AND circuits, and wherein the first logic means includes a delay circuit for preventing transfer of the data until after the first accumulating means is cleared and pulse generating means for entering a tag bit into the first stage of the first shift register.

22. A system for supplying split and offset data to a traffic signal controller in the form of electrical energy during successive operational timing cycles comprising, first data accumulating means, means for transferring said split and offset data into said first data accumulating means at a predetermined time in the cycle, second data accumulating means responsive to said first data accumulating means and remotely situated therefrom, and readout means coupled to said second data accumulating means and adapted to be connected to a traffic signal controller, said readout means providing said split and offset data in the form of electrical energy whenever said second accumulating means receives the entire quanta of data previously stored in said first accumulating means.

23. In a traffic control system, means for supplying split and offset data to a traffic signal controller in the form of electrical energy, said means comprising means producing said split and offset data,
timing means demarcating cycle length,
first data accumulating means,
means coupling said timing means to said generating means,
means transferring said data into said first data accumulating means at a predetermined instant in said cycle,
second data accumulating means responsive to said first data accumulating means and remotely situated therefrom,
said second data accumulating means receiving data from said first data accumulating means during a predetermined portion of the cycle,
and readout means coupled to said second data accumulating means,
said readout means producing said split and offset data in the form of electrical energy whenever said second accumulating means receives the entire quanta of data previously stored in said first accumulating means.

24. A communication system for transmitting informa-ion to a traffic signal controller during successive opera-ional timing cycles comprising, transmitting and receiv-ng shift registers, means coupled to both registers pro-iding pulses for serially advancing information from the ansmitting register to the receiving register during suc-essive cycles of operation, the repetition rate of the dvance pulses being determined relative to the duration f the timing cycle, each of said shift registers comprising predetermined number of stages, means coupling the al stage of the transmitting shift register to the first age of the receiving shift register, means responsive to e advancing pulses for coupling the information to lected stages of the transmitting register and transfer-g the information to the receiving register only during a predetermined portion of each of the cycles, utilization means, and means coupling the information from predetermined stages of the receiving register to the utilization means when the entire information coupled to the transmitting register is advanced into the receiving register.

25. A communication system for transmitting information to a traffic signal controller during successive operational timing cycles comprising, transmitting and receiving shift registers, means coupled to both registers providing pulses for serially advancing information from the transmitting register to the receiving register during successive cycles of operation, the repetition rate of the advance pulses being determined relative to the duration of the timing cycle, each of said shift registers comprising a predetermined number of stages, means including a multivibrator coupling the final stage of the transmitting shift register to the first stage of the receiving shift register, means including a digital counter responsive to the advancing pulses for coupling the information to selected stages of the transmitting register and transferring the information to the receiving register only during a predetermined portion of each of the cycles, the predetermined portion being demarcated by the advancing pulse count, utilization means, and means coupling the information from predetermined stages of the receiving register to the utilization means when the entire information coupled to the transmitting register is advanced into the receiving register.

26. A communication system for transmitting information to a traffic signal controller during successive operational timing cycles comprising, transmitting and receiving shift registers, each of said shift registers comprising a predetermined number of stages, means coupling advance pulses to both of said shift registers for transferring information from the transmitting register to the receiving register, first multivibrator means undergoing one cycle of operation in response to simultaneous occurrence of one of said advance pulses and an output pulse from the final stage of the transmitting shift register, second multivibrator means triggered by the first multivibrator means upon completion of each operating cycle of the first multivibrator means and providing a PCM pulse to the first stage of the receiving shift register whereby said PCM pulse is initiated after completion of said one advance pulse and is completed prior to initiation of the next-succeeding advance pulse, means coupling input energy to selected stages of the transmitting register, utilization means, and means coupling output energy from predetermined stages of the receiving register to the utilization means.

27. A communication system for transmitting information to a traffic signal controller during successive operational timing cycles comprising transmitting and receiving shift registers, each of said shift registers comprising a predetermined number of stages, means coupling advance pulses to both of said shift registers, first multivibrator means responsive to simultaneous occurrence of an advance pulse and an output pulse from the final stage of the transmitting shift register, second multivibrator means responsive to output pulses from said first multivibrator means and coupling output pulses to the first stage of the receiving shift register, digital counting means driven in synchronism with said advance pulses, an information source, means coupling binary coded information from said information source to the individual stages of the transmitting shift register, means responsive to the instantaneous count in said digital counting means for reading out information from said information source to the transmitting shift register, a plurality of AND circuits, each of said AND circuits responsive to output pulses from a predetermined receiving shift register stage, third multivibrator means responsive to output pulses from the final stage of the receiving shift register for energizing said AND circuits to read information out of the receiving shift register, utilization means, and means coupling output energy from said AND circuits to the utilization means.

28. The communication system of claim 27 wherein said means responsive to the instantaneous count in said digital counting means includes means for delaying application of output energy from said digital counting means to said information source.

29. The communication system of claim 27 wherein said first, second and third multivibrator means each comprises a monostable multivibrator.

30. A communication system for transmitting information to a traffic signal controller during successive operational timing cycles comprising transmitting and receiving shift registers for transferring information from the transmitting register to the receiving register during successive cycles of operation, each of said shift registers comprising a predetermined number of stages, means coupling the final stage of the transmitting shift register to the first stage of the receiving shift register, means coupling the information to selected stages of the transmitting register and transferring the information to the receiving register only during a predetermined portion of each of said cycles, utilization means, and readout means responsive to output energy from the final stage of the receiving shift register for coupling the information from predetermined stages of the receiving register to the utilization means.

31. The communication system of claim 30 wherein said means coupling input energy to selected stages of the transmitting register includes digital counting means driven in synchronism with said advance pulses, an information source, and means responsive to the instantaneous count in said digital counting means for reading out information from said information source to the transmitting shift register.

32. The communication system of claim 30 wherein said readout means comprises a plurality of AND circuits, means coupling output energy from individual stages of the receiving shift register to each of said AND circuits, multivibrator means responsive to output pulses from the final stage of the receiving shift register for supplying energy to one input of each of said AND circuits, and means coupling output energy from each of said AND circuits to the utilization means.

33. The communication system of claim 31 wherein said means responsive to the predetermined count in said digital counting means includes means for delaying application of information from said information source to the transmitting register.

34. The communication system of claim 32 wherein said means coupling the final stage of the transmitting shift register to the first stage of the receiving shift register includes multivibrator means for shifting the phase of output pulses produced by the final stage of the transmitting shift register with respect to the phase of the advance pulses.

References Cited

UNITED STATES PATENTS

| | | | |
|---|---|---|---|
| 2,946,044 | 7/1960 | Bolgiano et al. | 340—147 |
| 3,051,940 | 8/1962 | Fleckenstein | 340—168 |
| 3,100,890 | 8/1963 | Henning | 340—170 |
| 3,237,176 | 2/1966 | Jenkins. | |
| 3,281,795 | 10/1966 | Gural et al. | 340—167 |
| 3,300,775 | 1/1967 | Dowling | 340—41 |

JOHN W. CALDWELL, *Primary Examiner.*

D. J. YUSKO, *Assistant Examiner.*

U.S. Cl. X.R.

340—41